United States Patent [19]

Connell

[11] 4,363,520
[45] Dec. 14, 1982

[54] WHEEL COVER RETENTION

[75] Inventor: James Connell, Bloomfield Hill, Mich.

[73] Assignee: J. Connell Associates, Bloomfield Hills, Mich.

[21] Appl. No.: 147,421

[22] Filed: May 6, 1980

[51] Int. Cl.³ .............................................. B60B 7/06
[52] U.S. Cl. ................................ 301/37 P; 301/37 R; 301/37 PB
[58] Field of Search ................. 301/37 R, 37 P, 37 B, 301/37 T, 37 C, 37 CD, 37 TP, 37 PB, 108 R, 108 A

[56] References Cited

U.S. PATENT DOCUMENTS

| | | | |
|---|---|---|---|
| 2,945,723 | 7/1960 | Estes | 301/37 PB |
| 3,788,707 | 1/1974 | Connell | 301/37 P |
| 4,027,919 | 6/1977 | Foster et al. | 301/37 P X |
| 4,223,951 | 9/1980 | Muramatsu et al. | 301/37 B |
| 4,247,151 | 1/1981 | Brown et al. | 301/37 R |
| 4,247,152 | 1/1981 | Brown | 301/37 R |

FOREIGN PATENT DOCUMENTS 2249539  4/1974  Fed. Rep. of Germany ... 301/108 R

*Primary Examiner*—Charles A. Marmor
*Attorney, Agent, or Firm*—Jay C. Taylor

[57] ABSTRACT

Two different types of retention devices for attaching a wheel trim to a vehicle wheel are provided alternately at circumferentially spaced locations on the trim. Each retention device of one type comprises a generally axially extending barbed retention arm adapted to engage an axial flange of the wheel with spring force to embed its barb into the flange and attach the trim coaxially to the wheel. Each of the latter retention devices also preferably comprises a spring clip cooperable with portions of the wheel trim to prevent excessive bending of the clip during attachment and removal of the trim from the wheel and also to assure substantially coaxial alignment of the trim and wheel in predetermined axially spaced relationship when the trim and wheel are attached. Each retention device of the second type comprises a comparatively readily removable retainer preferably having a rounded locating projection adapted to seat in a conventional radially inwardly directed annular channel of the wheel flange when the trim is secured coaxially to the wheel.

9 Claims, 17 Drawing Figures

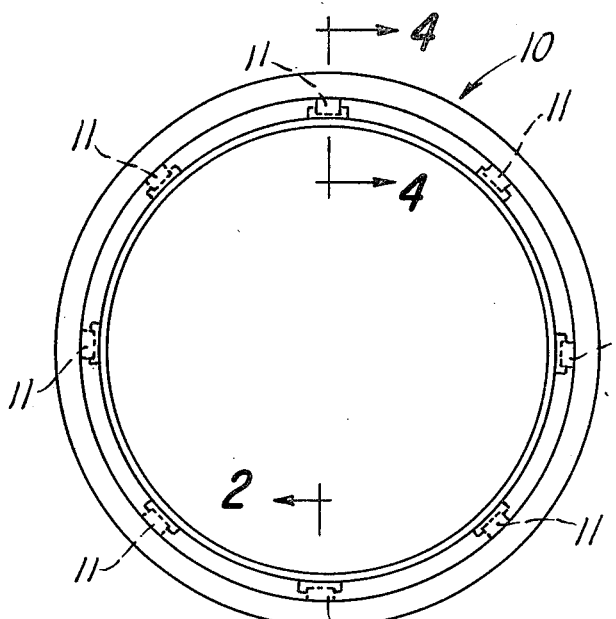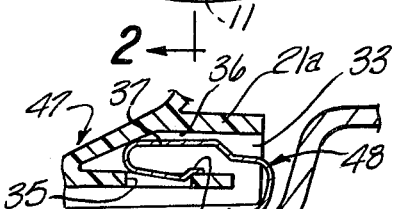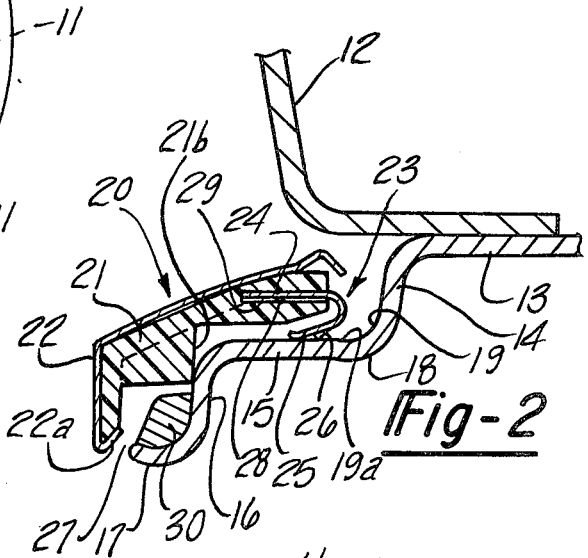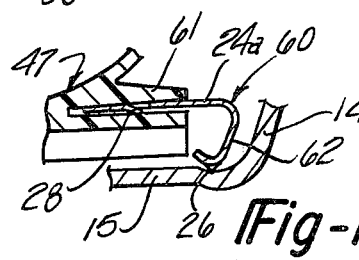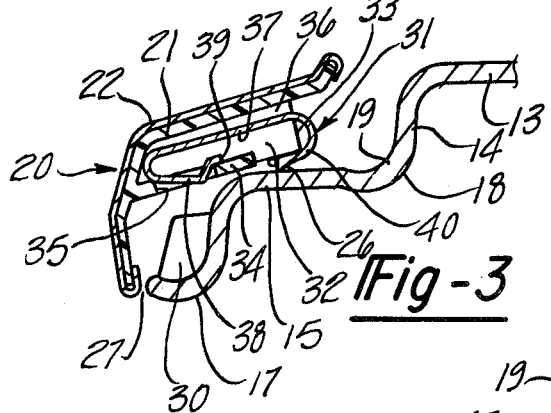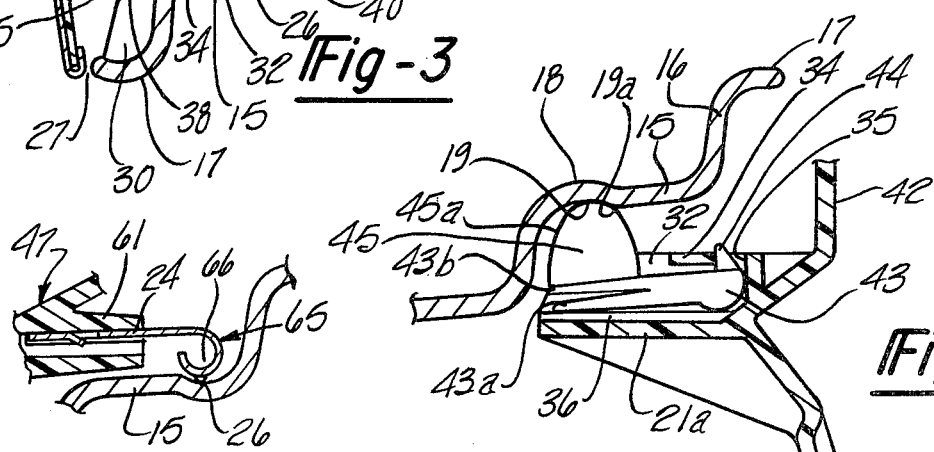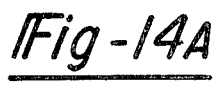

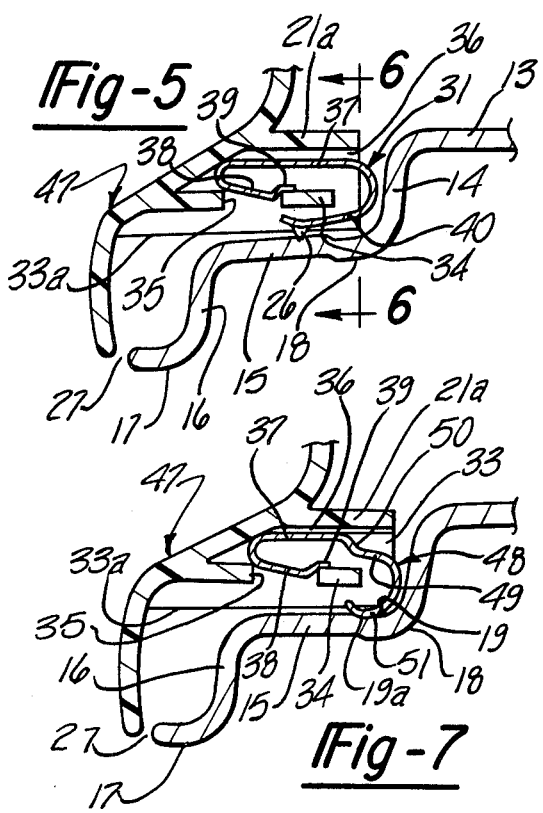
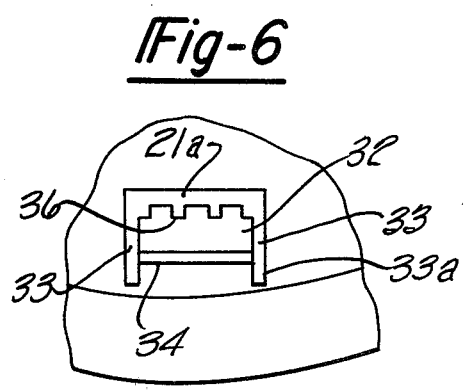
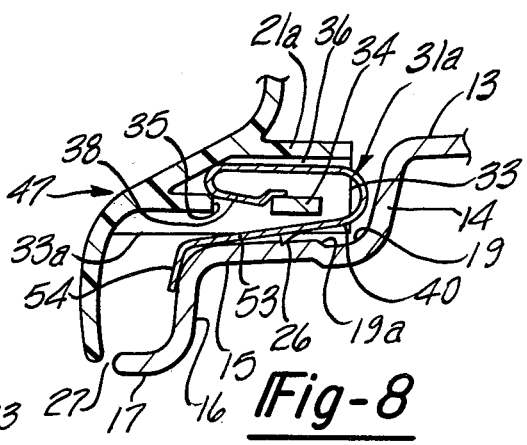
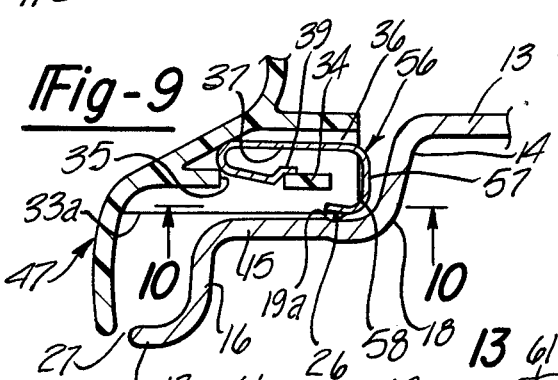
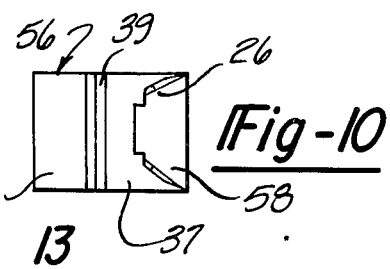
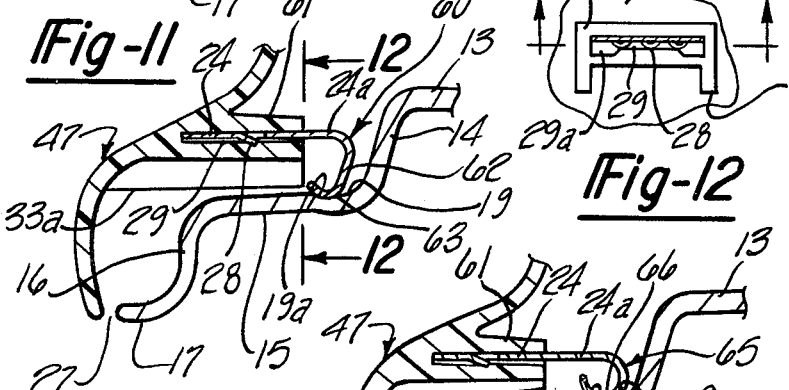
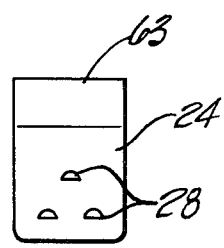
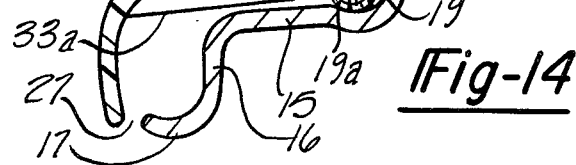

WHEEL COVER RETENTION

BACKGROUND AND OBJECTS OF THE INVENTION

This invention relates to wheel trims, which term herein includes wheel covers, trim rings and the like adapted to be removably attached to a vehicle wheel, and in particular relates to means for securing such covers or trims to an axial flange of the wheel.

Heretofore great effort has been expended in the development of wheel covers and retention means for positively securing the covers to the wheels so as to withstand various tests and road conditions tending to jar the covers loose. In consequence, considerable difficulty is often experienced when it is desired to remove the cover, as for example to replace or repair a dented or otherwise damaged cover or to change a tire. The retention means may be so effective that the cover cannot be removed without serious injury to the parts, with the result that after one or two removals, the retention means and sometimes the cover are damaged beyond use.

When a wheel cover is properly located coaxially on a wheel, the force required to secure the cover to the wheel is appreciably less than when the cover is secured eccentrically. Also when a cover is inadvertently secured eccentrically to the wheel, not only do the resulting unbalanced centrifugal forces tend to throw the cover from the wheel, but tire wear is accelerated and the vehicle ride can be objectionable.

In order to secure the cover coaxially to the wheel, it has been the practice heretofore to secure the cover at a number of circumferentially spaced locations, as for example six or eight. Thus if a careless mechanic fails to force one of the conventional retention devices properly against the wheel, the circumferentially adjacent retention devices assure a reasonably coaxial attachment between the cover and wheel.

A significant contribution of the present invention has resulted from the realization that the numerous retention devices required heretofore are merely to assure reasonable coaxial attachment between the wheel trim and the wheel, whereas if care is taken to attach the trim coaxially, a nominal number of conventional retention devices, as for example one-half the number employed heretofore, will secure the trim positively to the wheel under all typical driving conditions.

It is an important object of the present invention to provide improved retention means for a vehicle wheel trim wherein alternate retainers may be conventional and the remaining retainers may comprise a set of locating devices which are only nominally effective by themselves as retention devices and which are therefore easily removable from the wheel, but which are effective in assuring that the trim is located and secured coaxially on the wheel. In consequence of reducing the number of effective retention devices, the trim may be pried from the wheel with far less effort than has been required heretofore because only nominal force is required to pry the remaining retainers or locating devices from the wheel.

In order to remove a wheel cover from a vehicle wheel, it is customary to insert a heavy screwdriver or other pry between the cover and wheel at one circumferential location and pry the cover loose. Usually the free space between the prying tool and the vehicle wheel or tire is quite limited, with the frequent result that when the tool swings into engagement with the tire at the limit of the available prying movement, the retention device merely yields resiliently without in any way being dislodged from its attachment with the wheel rim. When the prying tool is removed, the retention device returns resiliently to its former attached position. On the other hand, if the prying operation is successful, the diametrically opposite retention device is often deformed beyond its elastic limit, with consequent damage to the overly stressed retention device and impairment of its attachment effectiveness for successive use.

Other important objects are to provide an improved wheel trim cooperable with conventional retention means and effective to limit the extent of eccentricity between the trim and wheel, and to provide such a cover which narrowly limits the amount of resilient movement that can be imparted to the retention means during a prying operation as described and which thereby prevents bending of any retention device beyond its elastic limit, and which also serves as a fulcrum for the wheel trim at a location diametrically opposite the prying tool to enhance the tools effectiveness in dislodging the attachment between the adjacent retention device and wheel flange.

Another object is to provide an improved retention device which has the retention effectiveness of conventional devices, but which comprises cam means for disengaging its attachment with the axial wheel flange when forced axially beyond a predetermined limit toward the wheel, thereby to achieve coaxial alignment between a wheel trim and wheel by assuring that each of the circumferentially spaced retention devices when attached to the wheel lies in substantially the same plane normal to the wheel axis.

Another object is to provide improved retention means for a wheel trim adapted to seat in the annular channel located in the surface of the axial wheel flange radially opposite the usual safety hump of the wheel flange. The retention means is resiliently urged radially outwardly against the axial wheel flange so that immediately after it moves inward beyond the outer sidewall of the aforesaid channel during attachment of the trim to the wheel, the retention means snaps into locating and retention position within the channel. As a result, coaxial alignment of the trim with the wheel is assured, fewer circumferentially spaced retention means are required than heretofore in order to provide adequate attachment of the trim to the wheel, and removal of the trim from the wheel when desired is facilitated.

Other objects are to provide improved retention means adapted to be resiliently seated within the aforesaid channel of the axial wheel flange as described above and which enable an effective compromise between retention effectiveness and removability, wherein improved resilient means are provided to resist any initial outward movement of the retention means beyond the axially outer sidewall of the channel within which it is located, but wherein after the retention means is moved axially outwardly from the channel, it is comparatively freely slidable axially thereafter to facilitate complete removal of the cover.

Other and more specific objects are to provide a retention means adapted to be resiliently seated and located within the aforesaid channel as described and comprising part of a formed ribbon of spring steel secured to the wheel trim and having resilient hinge portions yieldable to enable swinging of the retention means radially inward to facilitate its axial outward passage of the outer sidewall of the channel without permanently deforming the spring steel material by stressing it beyond its elastic limit; and to provide a particular embodiment of the invention wherein the retention means is connected to the hinge portion by an oblique arm of the formed spring steel, such that during any initial movement of the trim axially from its attachment with the wheel, the force seating the retention means within the channel is increased to resist accidental removal of the cover.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a schematic elevational view of a wheel trim ring showing the circumferentially spaced locations 11 of the wheel trim improvements and retention means embodying the present invention. Various modifications of the invention are illustrated in the subsequent views and may be used either with a full wheel cover or a trim ring.

FIGS. 2 and 3 are enlarged sectional views illustrating two different retention devices embodying the invention and suitable for use at alternate locations 11 of FIG. 1, the sections being taken for example in the direction of the arrows substantially along the line 2—2 of FIG. 1.

FIG. 4 is a view similar to FIGS. 2 and 3, but showing another modification taken for example in the direction of the arrows substantially along the line 4—4 of FIG. 1.

FIG. 5 is a view similar to FIGS. 2 and 3 showing another modification.

FIG. 6 is a fragmentary sectional view taken in the direction of arrows 6—6 of FIG. 5.

FIGS. 7, 8 and 9 are views similar to FIGS. 2 and 3, but showing three additional modifications.

FIG. 10 is a view of the spring clip of FIG. 9, taken in the direction of the arrows 10 of FIG. 9.

FIG. 11 is a view similar to FIGS. 2 and 3, showing another modification.

FIG. 12 is a fragmentary sectional view taken in the direction of the arrows 12—12 of FIG. 11.

FIG. 13 is a view of the spring clip of FIGS. 11 and 12, taken in the direction of the arrows 13—13 of FIG. 12.

FIG. 14 is a view similar to FIGS. 2 and 3 showing another modification.

FIGS. 7A, 11A, and 14A are views similar to FIGS. 7, 11 and 14 respectively showing three additional modifications.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DESCRIPTION OF THE PREFERRED EMBODIMENTS

Referring to the drawings, several embodiments of the present invention are illustrated by way of example and may be employed with a wheel trim 10, FIG. 1, which may comprise either a full cover or an ornamental trim ring and which may be conventional except for the locating and retention means described in detail below. Suitable retention means for securing the trim to a vehicle wheel are provided at a plurality of uniformly and circumferentially spaced locations 11. Eight such locations 11 are shown in FIG. 1, although six suitable retention devices at uniformly spaced locations are frequently adequate. It is contemplated that each of the several retention devices described herein will be used only at alternate locations 11. A different one of the retention devices described below will be used in the remaining alternate locations 11.

A fragmentary peripheral portion of a typical automobile wheel 12 is illustrated in FIG. 2. The periphery of the wheel 12 comprises a rim channel 13 that underlies a vehicle tire and has an outer side wall 14 that extends radially outwardly to an axial rim flange 15. The axially outer edge of flange 15 merges with a radial flange 16 that extends outward and terminates in a radially and axially outwardly rounded portion 17 to which wheel balancing weights are frequently secured. The axially inner edge of flange 15 comprises a radially outward annular safety hump 18 which provides a radially opposite inwardly opening annular channel 19.

The retention means illustrated in FIG. 2 is associated with an ornamental trim ring 20 comprising a hard molded annular plastic body 21 covered by a thin metal trim member 22 secured thereto, as for example by inbent flanges 22a. A resilient hairpin type retention clip 23 formed from a ribbon of spring steel provides a fixed axial arm 24 embedded within the body 21 and an oblique resilient retention arm 25 connected by means of a rounded U-type loop comprising a spring hinge urging the arm 25 radially outwardly against the flange 15. The arm 25 is provided with a pair of sharp barbs 26 adapted to embed into the flange 15 at a location axially outward of the channel 19 in consequence of spring force exerted by the arm 25. The axially outer end of the arm 25 terminates in an inbent cam portion adapted to slide along the flange 15 when the adjacent portion of the trim ring 20 is cocked and pried axially outward from the wheel, as for example by means of a screwdriver or other pry inserted into the space 27 between the flange 22a and axially outer end of the rounded rim flange 17. The space 27 and the location of engagement between the barbs 26 and flange 15 may be predetermined by means of a radially extending shoulder 21b integral with the plastic ring 21. The shoulder 21b abuts the flange 16 to limit the axial inward movement of the ring 20 relative to the wheel 12. In this regard, the axial dimension between the flange 14 and the adjacent inner U-loop of clip 23 vary too much, even with trim 20 and wheels 12 of the same make, to enable use of an abutment between the latter U-loop and flange 14 for wheel trim locating purposes.

As illustrated in FIG. 10, the barbs 26 may be conventionally upturned circumferentially spaced corner or edge portions of the resilient retention arm, which may have a portion of reduced width extending axially outward beyond the barbs 26 to comprise said inbent cam portion. The axially extending fixed arm 24 of the clip 23 may be molded as an insert within the plastic body 21 or, preferably, it may be provided with several sharp tabs 28 lanced therefrom, FIGS. 12 and 13 to extend radially outwardly and axially inwardly and resiliently engage the radially outer wall of a shallow axially inwardly opening recess 29 formed within the body 21 at each alternate location to receive an arm 24 snugly therein. The circumferentially spaced axially extending edges of each shallow recess 29 are enlarged radially outward at 29a to provide a pair of axially extending shoulders underlying the sharp edges of a corresponding pair of tabs 28 to enhance their effectiveness in embedding into the hard material of the plastic 21, as described in co-pending application, Ser. No. 086,004, filed Oct. 17, 1979, issued May 11, 1982, as U.S. Pat. No. 4,328,997, to which reference may be had for further details.

FIG. 3 illustrates a modification of a trim ring 20 similar to that of FIG. 2, except for the provision of the shoulder 21b and the retention clips 23. In FIG. 3, a retention clip 31 also formed from a ribbon of spring steel is confined within an axially inward opening recess 32 similar to that illustrated in FIGS. 5 and 6 at each of the alternate locations 11.

Each recess is defined by a pair of circumferentially spaced side walls 33 of the molded plastic body 21 that extend radially outward, and a wall 34 of the molded plastic body 21 spaced radially outwardly from a generally axially extending portion of the body 21 and spanning the side walls 33. An opening 35 is formed in the axially outer portion of wall 34. A plurality of axially extending reinforcing ribs or runners 36 project radially outwardly from the body 21 to provide a supporting platform radially opposite wall 34 for a generally axially extending fixed portion 37 of the retention clip 31. The axially outer end of the fixed portion 37 curves radially outwardly and axially inwardly in a hairpin loop seated against the body 21 within the recess 32 and thereafter extends at 38 into the opening 35 and terminates in a radially inwardly offset portion 39 confined under resilient tension against the inner edge of the opening 35, thereby to urged the clip 31 axially into the recess 32 in an axially outer direction and also to urge the fixed axially extending portion 37 radially inwardly against the platform ribs 36.

The axially outer end of the fixed portion 37 curves radially and axially outwardly in a reverse hairpin loop or spring hinge to provide a radially outer axially extending retention arm 40 similar to arm 25. A pair of circumferentially spaced barbs 26 are provided on arm 40 as described above and are resiliently urged against the flange 15 to embed thereinto at a location axially outward of the channel 19 when the cover 20 is secured properly to the wheel 12.

The barbed retention devices of FIGS. 2 and 3 are very effective in attaching wheel trim to a flange such as the axially extending flange 15. Accordingly if the wheel trim is carefully secured coaxially to the wheel 12 in proper axially spaced relationship, as few as three uniformly spaced barbed retention devices of the type described are adequate to secure the trim positively to the wheel. The retention devices of FIGS. 2 and 3 are not particularly helpful in assuring the proper coaxial alignment. The shoulders 21b of FIG. 2 are effective to limit the axial inward movement of the wheel trim and facilitate its proper coaxial alignment when it is comparatively new. However, after the FIG. 2 wheel trim has been pounded into place on a wheel several times, the shoulders 21b frequently break or are deformed and their usefulness as locating stops is impaired.

Furthermore, it is frequently difficult to remove the wheel trim when retained by the retention devices of FIGS. 2 and 3. Typically, a wheel trim is removed by inserting the blade of a screwdriver into the space 27 and swinging the handle of the screwdriver toward the tire to pry the trim axially outwardly. When the barbs 26 are securely embedded within the flange 15, the retention clips 23 or 31 frequently merely yield at the associated hairpin loop or spring hinge connected with the retention arms 25 or 40. When the prying force is released, the spring clip may return to its initial condition and the barbs will not be dislodged from their attachment to the flange 15. In addition, in some situations the spring clips are deformed beyond their elastic limits during the prying operation. Thereafter they become useless for securing the trim to the wheel.

A concept of the invention has thus been to improve the removability of the barb-type retention clip, without impairing its attachment effectiveness, and also to locate the barb-type retention clips at alternate locations 11. A second set of retention devices which may be considered primarily as locating devices effective to insure the desired coaxial mounting of the trim on the wheel and which may be removed from the wheel far more readily than the barb-type retention devices described herein is provided at the remaining locations 11.

A type of readily removable retention device or locator that may be employed alternately with the barb-type retainers is illustrated in FIG. 4 with a molded plastic wheel cover 42. The latter has a plurality of uniformly spaced axially inwardly opening recesses 32 as described above, except that the radially inner floor of each recess 32 comprises an axially extending plastic flange 21a integral with the wheel cover 42.

In lieu of a spring steel retention clip such as 23 or 31, a resilient plastic retainer 43 has a clothespin type body defining two legs 43a and 43b and a radially yieldable cam element 44 confined within the axially outer end of the retainer 43 for moving radially inward from the FIG. 4 position. Molded integrally with the radially outer leg 43b is a locating retainer 45 having a radially outer rounded extremity adapted to seat within the similarly rounded base of the channel 19 and to be resiliently urged radially outward to the seated position by the resiliency of the body 43 and leg 43b.

Assembly of the retainer or locator of FIG. 4 with the wheel cover 42 is accomplished by inserting the rounded head of the retainer 43 axially into the recess 32, with the rounded head and leg 43a supported on the ribs or runners 36. When the cam element 44 engages the axially inner edge of the wall 34, the oblique leading cam edge of the cam 44 forces the latter radially inwardly against comparatively light resilient means not shown. When the radial trailing edge of the cam 44 enters the recess 35 upon continued axial movement of the retainer 43 toward the wheel cover 42, the cam 44 is returned by resilient means to the FIG. 4 position, thereby to interlock the retainer 43 and wheel cover 42. Thereafter, the wheel cover 42 may be aligned coaxially with the wheel 12 and secured thereto by being moved axially toward the wheel until the leading oblique cam surface 45a of the locator 45 engages the rounded juncture between the flanges 15 and 16. The locator 45 is then forced radially inwardly against the spring force of the leg 43b, resiliently pressing the latter toward the leg 43a. When the rounded outer surface of the locator 45 passes the axially outer wall 19a of the channel 19, the projection 45 is snapped by the spring force of the resiliently stressed leg 43b radially outward into a seated position within the channel 19.

By providing one such locator 45 at each of the several alternate locations 11, the wheel cover 42 will be aligned coaxially with the wheel 12 and axial wheel flange 15. Also corresponding elements of each locator 45 will lie in the same transverse plane perpendicular to the axis of the wheel as determined by the axial location of the channel 19. In the latter regard the dimensions of the latter and of the safety hump 18 are maintained within fairly close tolerances in order to assure the proper location of the conventional pneumatic tire.

By virtue of the interfitting rounded engagement of the locator 45 within the recess 19, it is apparent that the frictional engagement therebetween will be appreciably less than the corresponding frictional engagement of the barbs 26 embedded within the flange 15. Accordingly, although the locator 45 provides a limited amount of retention to maintain the attachment between the wheel cover and wheel, the primary function of the locator 45 is to assure proper coaxial alignment of the cover on the wheel. Thus the biting engagement between the retention barbs 26 and flange 15 will effectively prevent accidental removal of the wheel cover, regardless that the barbs are provided at only the alternate locations 11, such that only half as many barb type retainers are employed as has been conventional heretofore. Furthermore, by properly locating the wheel cover coaxially with the wheel, excessive tire wear is reduced and driving qualities of the vehicle are improved.

FIGS. 5 and 6 illustrate a modified barb type retention that also incorporates a provision to limit coaxial misalignment. A molded plastic wheel cover 47 is provided with a plurality of circumferentially spaced recesses 32, as for example as described above at the alternate locations 11. Each recess 32 is defined by a pair of circumferentially spaced radial walls 33 and an outer wall 34 having the opening 35 therein and spaced radially from the platform ribs 36. The base or radially inner wall of the recess 32 is provided by a flange 21a integral with the cover 47 and extending axially inward therefrom toward the wheel 12 when attached thereto.

A resilient retention clip 31 is formed as described above from a ribbon of spring steel to provide the axially extending portion 37 seated on the runners 36, and the resilient axially outer hairpin loop connecting the arms 37 and 38 and confined within the axially outer end of the recess 32 in abutment with the body of the cover 47. The arm 38 extends radially outwardly into the opening 35 and terminates in a radially inwardly offset portion 39 engaging the wall 34 under radially outwardly directed spring tension at the axially inner end of the opening 35. The axially inner end of the clip 31 similarly comprises a hairpin loop or spring hinge connecting the portion 37 with a radially and axially outwardly extending retention arm 40 having the barb 26 adapted to frictionally engage and embed into the flange 15 with the radially outwardly directed resilient force of the stressed arm 40 at a location axially outward of the safety hump 18. The radial dimension of the ribs 36 is also carefully controlled to assure location of the clip extension 37 radially within close tolerances. The other dimensions of the cover 47 are then measured from the ribs 36 as a reference.

Without some provision to the contrary, during careless or accidental assembly of the cover 47 eccentrically with respect to the wheel flange 15, the arm 40 may be forced inwardly toward the outer wall 34. Likewise by reason of the frictional engagement between the barbs 26 and flange 15, the arm 40 may be dragged axially outward with respect to the fixed portion 37 as the wheel cover 47 is moved axially toward the wheel 12 during the assembly operation. In consequence of these bending movements of the arm 40, the latter is often stressed sufficiently to be permanently deformed and in fact to cause breakage of the spring steel at the region of the axially inner hairpin loop.

In the FIG. 5 construction, the walls 33 are extended radially outwardly at 33a beyond the wall 34, FIG. 6 so as to terminate as closely as feasible to the flange 15 when the cover 47 is properly attached. Sufficient clearance between the extensions 33a and flange 15 must be maintained to prevent interference therebetween in the event of an unusual stack up of tolerances in the dimensions of the cover 47 and wheel 12, as for example approximately 0.030 inches clearance for a fifteen inch wheel. In consequence, the maximum excentricity of the wheel cover 47 for such a wheel would be approximately 0.030 inches, and damage to the spring clip 31 or its breakage as a result of improper alignment is completely eliminated. Furthermore, by virtue of the radial spacing between the wall extensions 33a and the wheel flange 15, wearing of the extensions 33a that would impair their usefulness is nominal.

The radial extensions 33a in close proximity to the flange 15 also facilitate removal of the wheel cover 47 when desired. When the blade of a screwdriver is inserted into the clearance 27 and pried axially outward against the adjacent portion of the wheel cover 47, the latter will move radially outwardly and cock the cover out of coaxial alignment. The diametrically opposite extensions 33a will thus be moved radially inwardly into engagement with the adjacent portions of the flange 15 and serve as a fulcrum about which the wheel cover 47 may be swung in a removal operation. By sucessively changing the circumferential location of the prying operation, the wheel cover 47 may be readily eased axially outwardly and removed from the wheel 12 without at any time subjecting the cover 47 or retention means 31 to undue bending forces. Furthermore by alternating the barbed type retention device of FIG. 5 with a more readily removable locating retainer such as a rounded locator 45 of FIG. 4 or one of the locators described below in reference to FIG. 7, 11 or 14, the total force required at any localized region to remove the cover 47 is significantly reduced with a consequent reduction in any tendency to deform or damage the cover.

FIG. 7 illustrates another modification of a locating retainer that may be alternated with a barbed type retention. In FIG. 7, the cover 47 is provided with a plurality of circumferentially spaced axially inward opening recesses 32 associated with the extensions 33a as in FIG. 5. A retention clip 48 comprising a formed ribbon of spring steel has a fixed portion 37 and arm 38 connected by the hairpin loop as in FIG. 5 and similarly retained within each recess 32. The axially inner end of the fixed portion 37 is connected with a radially outwardly offset axial extension 49 by a generally radially extending portion 50 which inclines axially inward and radially outward from the portion 37. The axially inner end of the extension 49 curves radially and axially outward in a reverse loop shaped at its radially outer portion 51 to conform to the juxtaposed portion of the channel 19 and to seat therein adjacent the axially outer sidewall 19a when the wheel cover 47 is properly attached coaxially to the wheel flange 15, as for example by means of a set of one of the barbed retention devices described herein. The connections between the extension 50 and each of the extensions 37 and 49 also comprise spring hinges about which the rounded locating portion 51 may swing during assembly and disassembly of the cover from the wheel. The spring clip 48 is dimensioned so that when the cover 47 is properly attached to the wheel 12, the locating extension 51 will be resiliently urged radially outward by the spring force of the clip 48 into the seated position shown within channel 19.

The locating portion 51 operates somewhat like the above described locator 45. When the wheel cover 47 is aligned coaxially with the wheel 12 and moved axially toward the latter in an assembly operation, the axially inner or leading portion of the locator 51 will engage the rounded connection between the flanges 15 and 16 and cam the portion 51 radially inward against the spring force of the clip 48. Upon continued axial inward movement of the cover 47, the rounded portion 51 will slide freely along the flange 15 until it passes the radially outer sidewall 19a, whereupon the locator 51 will be resiliently snapped into the seated position shown in FIG. 7. The extensions 33a in proximity to the flange 15 operate as described above in regard to FIG. 5 to prevent inadvertent deformation of the retention clip 48 during assembly or removal of the wheel cover 47.

Again the retention efficiency of the locator 51 may be comparatively slight as compared to the frictionaal engagement effected by the barbs 26 for example, but the locator 51 positively locates the wheel cover in coaxial alignment in the manner of the locator 45. Any minor attempt to move the wheel cover 47 axially outward from the attached position shown in FIG. 7 will merely cause the locator 51 to swing axially inward primarily about the resilient hinge connection between the fixed extension 37 and the extension 50. The force of the spring hinge between the extensions 49 and 50 will continue to urge the locator 51 radially outwardly into the seated position shown. Thus any small inadvertent axially outward movement of the wheel cover 47 will not dislodge the locator 51 from its channel 19, so that when such force on the cover 47 is released, the cover 47 will be returned to its proper attached position by the spring force of the clip 48.

When it is actually desired to remove the wheel cover 47, the latter may be pried axially outwardly as described above in connection with FIG. 5. Also as described in regard to FIG. 5, the extensions 33a serve as a fulcrum during the prying operation. The initial outward movement of the cover 47 will effect a slight straightening of the clip extension 50 toward an axial position by yielding of the aforesaid spring hinges. After a limited axial straightening of the extension 50 and upon continued axial outward movement of the cover 47, the leading edge of the locator 51 will slide by cam action past the wall or shoulder 19a against the radially outward resilient force urged by the clip 48. Thereafter the rounded locator 51 will slide readily along the flange 15 as the cover 47 is removed from the wheel.

FIG. 8 illustrates a barb type retention 31a substantially the same as that illustrated in FIGS. 5 and 6 except that the retention arm 40 extends axially outward beyond the barbs as a lever 53 of reduced circumferential width and terminates in a radially extending cam 54. The cam 54 is adapted to engage the rounded connection between the flanges 15 and 16 when the cover 47 is at its desired coaxial position of attachment with the wheel 12. An attempt to force the cover axially toward the wheel beyond the desired position illustrated in FIG. 8 will cause the cam 54 to ride radially inward along the aforesaid rounded flange connection against the spring force of the retention arm 40 and cause the barb 26 of FIG. 8 to be withdrawn from its biting engagement with the flange 15. Thereafter when the force urging the wheel cover 47 excessively toward the wheel is removed to enable axial outward movement of the cover 47 during operation, the cam 54 will then ride radially outwardly along the aforesaid rounded flange connection and return to the FIG. 8 position whereat the barb 41 will again embed into the flange 15. The FIG. 8 structure thus achieves the advantages enabled by the extensions 33a of FIGS. 5 and 6, which are primarily effective to maintain the cover in coaxial alignment and in addition provides means for maintaining the cover 47 in a desired axial relationship with respect to the wheel 12.

FIGS. 9 and 10 illustrate a modified retention clip 56 comprising a formed ribbon of spring steel suitable for use with a wheel cover 47 and wheel 12 as described above, but where the axial space between the channel 19 and flange 14 is comparatively limited. The axially outer fixed portion of the spring clip 56 may be the same as the corresponding portions of the clips 31 and 48 and are retained in axially opening recesses 32 as described above. Instead of the axially inner hairpin loop of FIGS. 5 and 8, the axially inner end of the extension 37 is joined at a spring hinge with a generally radially extending arm 57 that is connected at its outer end with a generally axially outward extending retention arm 58. The latter may be rounded and adapted to be seated within the channel 19 adjacent the axially outer sidewall 19a, as in FIG. 11, and maintained at the seated position by radially outward spring force exerted by the tensed arm 58, or it may be provided with barbs 26 adapted to embed into the channel 19 adjacent the sidewall 19a in consequence of the spring force of the tensed arm 58.

The barbed retention of FIG. 9 engaging the sidewall 19a achieves very effective retention, so that retention devices 56 need only be applied at alternate locations 11. Also in the manner of the locators 45 and 51 for example, the barb retention of FIG. 9 assists in locating the wheel cover 47 coaxially on the wheel, although in the usual instance rounded locators such as 51 or 45 will be provided at the locations 11 alternating with the retention clips 56.

FIGS. 11 through 13 illustrate a modified retention clip 60 also suitable for use with the cover 47 and wheel 12. The clip 60 is formed from a ribbon of spring steel to provide a fixed arm or extension 24, similar to that described in regard to FIG. 2, confined at alternate locations 11 within a shallow recess 29 opening axially inward from plastic flange 61 molded integrally with the plastic body of the cover 47. As illustrated in FIGS. 12 and 13, the fixed arm 24 is provided with several sharp edged tabs 28 lanced therefrom to extend radially outward and axially inward to resiliently engage and embed into the radially outward adjacent wall of the recess 29. Also as described above, the axially extending circumferentially spaced edge portions of the recess 29 are enlarged radially outwardly at 29a, FIG. 12, to provide a pair of shoulders of the hard plastic material defining the recess 29. The shoulders underlie the sharp edges of a corresponding pair of the tabs 28 and thus increase the effectiveness of the frictional engagement between the tabs 28 and the material of the wheel cover 47.

The wheel cover 47 with the integral flange 61 and recess 29 may be molded separately from the clips 60. Thereafter the clip 60 with the lanced tabs 28 may be secured to the cover 47 by insertion of the fixed arm 24 into the recess 29 to complete the assembly as illustrated in FIGS. 11 and 12. The resilient barbs 28 will embed into the flange 61 to resist withdrawal of the clips 60. The recesses 29 for the clip arms 24 are incomatible with the recesses 32 for the various clips 31, 48 and 56, for example. Accordingly, the two types of recesses may be provided alternately in a cover 47 to prevent the inadvertent assembly of two identical retention devices at juxtaposed rather than alternate locations 11.

The fixed arm 24 of FIG. 11 extends at 24a axially beyond the flange 61 and is connected by a rounded spring hinge with a generally radially extending arm 62 that inclines radially and axially outwardly and terminates in a rounded radially inbent locating portion 63 adapted to seat in the channel 19 adjacent the side wall 19a when the cover 47 and wheel are properly assembled. The extension 24a is resiliently stressed at the attached position illustrated in FIG. 11 to urge the arm 62 and rounded locator 63 radially outward to the seated position shown.

By virtue of the inclination of the arm 62, any attempt to move the cover 47 axially outward will cause the arm 62 to swing counterclockwise relative to the fixed portion 24 and urge the locator 63 with even greater force radially into the channel 19. Thus the initial stage of any attempt to remove the wheel cover 47 in FIG. 11 is effectively resisted. Upon continued axial outward movement of the cover 47, the rounded leading outer portion of the locator 63 will cam the locator 63 over the sidewall 19a against the resilient force of the portion 24a, whereupon the locator 63 may readily slide axially along the flange 15 to facilitate removal of the cover.

The retention clip 60 may be employed by itself to secure light weight covers to a wheel 12 and may also be alternated with the barb-type retainers as described.

FIG. 14 illustrates a retention clip 65 suitable for use with the cover 47 and wheel 12 similarly to the clip 60 of FIG. 11, and is similarly formed from a ribbon of spring steel to provide the fixed axial portion 24 and resiliently biased arm or extension 24a effective as described above in regard to FIG. 11. In FIG. 14 the extension 24a terminates in a generally circular locator loop 66 adapted to be urged resiliently into the channel 19 by the spring force of arm 24a and is thus preferred for use in applications where the radial spacing between flanges 61 and 15 is comparatively limited. Like the locator 63, the locator 66 will be employed with alternate barb type retention clips.

FIGS. 7A, 11A and 14A illustrate modifications similar to FIGS. 7, 11 and 14 respectively, except possibly for the magnitude of the spring forces and dimensions, and also the provision of barbs 26 on the corresponding rounded locators 51, 63 and 66 adapted to embed into the material of the flange 15 within the channel 19 or the wall 19a when the wheel cover 47 is properly attached coaxially to the wheel 12. The spring force of the corresponding clips as described, urging the barbs 26 radially outward into biting engagement within the channel 19, achieve a retention effectiveness comparable to that of the above described barb type retainers. Accordingly the retention devices of FIGS. 7A, 11A and 14A may also be employed at the alternate locations 11. A set of any one of the locator devices described herein, such as the locator-retainers of FIG. 4, 7, 11 or 14, may be provided at the remaining location 11 to achieve the desired coaxial alignment of the cover 47 with the sheel. In other respects, the clips of FIGS. 7A, 11A and 14A are resiliently yieldable and operate in the same manner as the clips described in regard to FIGS. 7, 11 and 14.

The retention barbs 26 of FIGS. 7A, 11A and 14A when seated within the channel 19a also cooperate to facilitate the desired coaxial alignment as well as to provide effective retention. Accordingly in some instances each of the retention devices of FIGS. 7A, 11A and 14A may be provided at the alternate locations 11 as aforesaid and additional locating devices at the remaining locations 11 may not be required.

Where the rounded locators of any one of FIG. 4, 7, 11 or 14 for example are required at the locations 11 alternating with any one of the barbed retention devices described herein, the recesses 29 or 32 for the rounded locators will be incompatible as far as dimensions are concerned with the corresponding alternate recesses provided for the barbed retention devices, thereby to assure during fabrication of the wheel cover that the rounded locators will be arranged alternately with the barbed retention devices.

What I claim is:

1. A wheel trim adapted for attachment to an annular axial flange of a vehicle wheel having an annular safety hump and an annular channel in the radially opposite outer and inner surfaces respectively of the flange, said cover having a plurality of circumferentially spaced spring clips secured thereto, alternate clips comprising a first set thereof, each clip of said first set having retention means including a sharp barb and means for resiliently urging said barb into biting engagement with said flange to effect said attachment, the clips alternating with the clips of said first set comprising a second set, and means to facilitate the attachment of said cover in coaxial alignment with said wheel comprising resilient locating means of each clip of the second set adapted to seat in said annular channel adjacent the latter's axially outer sidewall with radially outwardly directed spring force without biting into said channel when in said alignment and also to slide axially outwardly from said channel and along said flange without biting thereunto when said trim is forced from said wheel.

2. The combination according to claim 1, the retention means of the first set being arranged to locate said barb axially outward of said hump to effect said attachment when said locating means is seated in said channel.

3. The combination according to claim 1, the number of clips in the first set being equal to the number of clips in the second set, means for assuring that the clips of each set alternate circumferentially with the clips of the other set comprising separate means for securing each set of clips to the trim, the means for securing the clips of the first set to the trim being incompatible with the means for securing the clips of the second set to the trim.

4. The combination according to claim 3, the means for resiliently urging each barb being also resiliently yieldable radially inwardly to enable said trim to be pried axially from its attachment with said wheel, the locating means of each clip of the second set comprising a locating portion dimensioned to snap into seated position within said channel when moved to a predetermined position axially inward of said outer sidewall of said channel, said locating means also comprising resilient means for yieldingly urging each locating portion radially outwardly to snap the latter into its seated position and for yielding radially inwardly to enable said locating portion to pass from its seated positions axially outwardly of said axially outer sidewall when said trim is pried from said wheel.

5. The combination according to claim 3, means to facilitate axial outward passage of said axially outer sidewall by said locating portions from their seated positions and for thereafter materially reducing the force required to move said locating portions axially outward with respect to the force required to move said barbs axially outward from their attachment with said flange comprising cam means on each locating portion engageable with said outer sidewall upon said axial outward passage to cam said location portions radially inwardly in opposition to the force of said resilient means urging said locating portions radially outward, and also comprising a glider surface of each locating portion engageable with said flange in low friction sliding engagement compared to the frictional engagement of each barb with said flange during coaxial movement of said trim with respect to said wheel.

6. The combination according to claim 1, said means to facilitate coaxial alignment of said trim and wheel also comprising means to limit radial compression of said retention means by said wheel flange when said trim is attached eccentrically thereto comprising a plurality of circumferentially spaced shoulders of said trim associated with selected clips respectively, each shoulder being adjacent to and spaced circumferentially from its associated clip and extending radially outward toward said flange for confronting the same in closely spaced proximity when said trim is attached coaxially thereto.

7. The combination according to claim 1, said means for resiliently urging said barb being also resiliently yieldable radially inwardly for enabling the coaxial movement of said trim toward said wheel, said means to facilitate coaxial alignment of said trim and wheel also comprising means to prevent said attachment when said trim is cocked beyond a predetermined extent out of coaxial alignment with said wheel, the last named means comprising cam means on said retention means for engaging said wheel flange and camming said retention means radially from said flange when said retention means is moved axially toward said wheel beyond a predetermined limit.

8. The combination according to claim 1, said means for facilitating the coaxial attachment of said trim with said wheel also comprising means for limiting the eccentricity of said trim when attached to said flange comprising a plurality of shoulders of said trim associated with certain of said clips respectively, each shoulder being adjacent to and spaced circumferentially from its associated clip and extending radially outwardly for confronting said flange in closely spaced proximity when said trim is attached coaxially thereto.

9. The combination according to claim 8, each clip of said first set having radially spaced arms connected by an axially outwardly opening loop dimensioned to be compressed resiliently to a generally U-shape to effect a radially directed force when said trim is attached to said wheel, one of said arms having said retention means and the other being secured to said trim.

* * * * *